J. E. GOODHUE.
CORN HUSKING MACHINE.
APPLICATION FILED MAY 25, 1912.
1,040,663.
Patented Oct. 8, 1912.
3 SHEETS—SHEET 1.
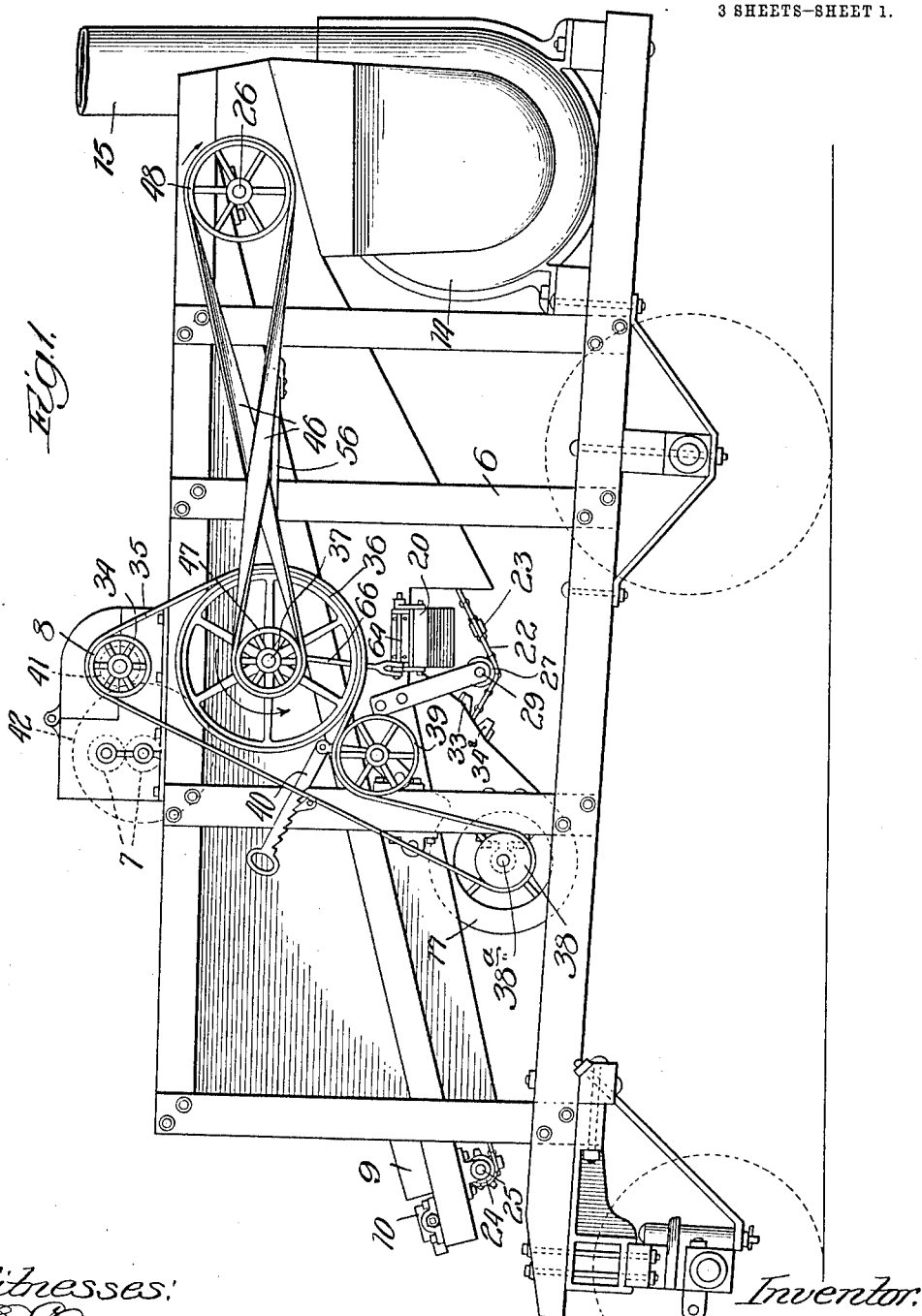
Witnesses:
Inventor:
James E. Goodhue,

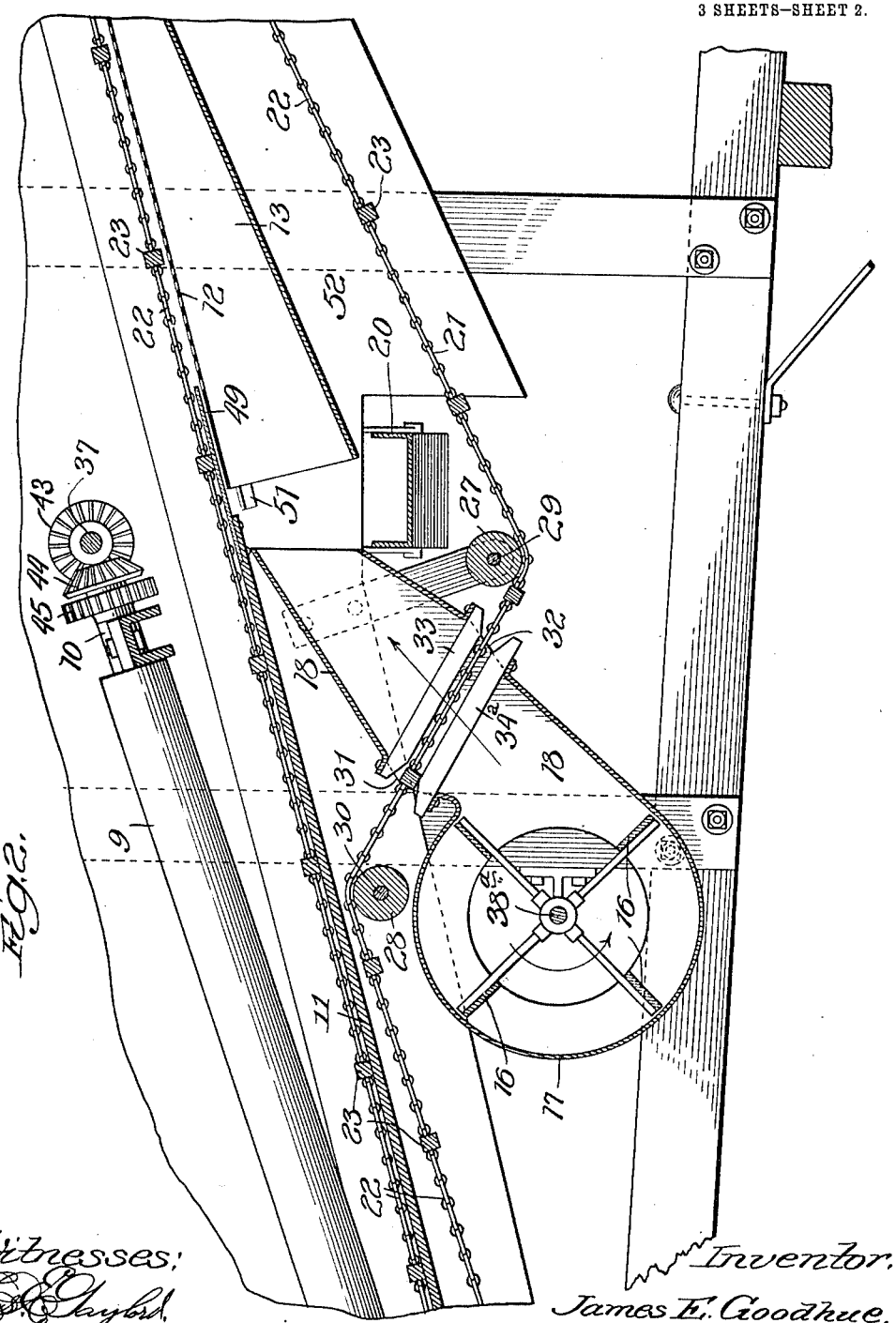

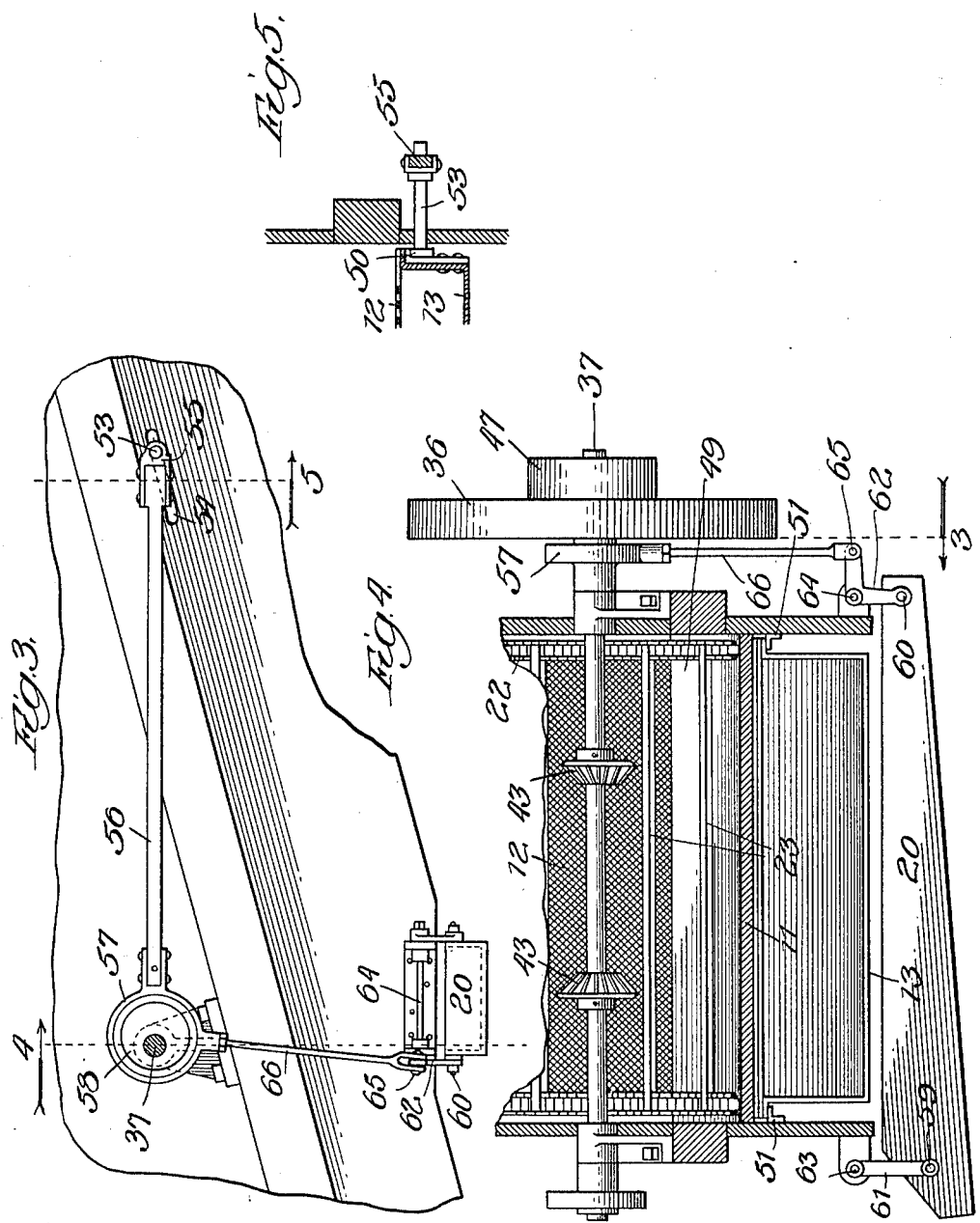

UNITED STATES PATENT OFFICE.

JAMES E. GOODHUE, OF ST. CHARLES, ILLINOIS.

CORN-HUSKING MACHINE.

1,040,663.  Specification of Letters Patent.  Patented Oct. 8, 1912.

Application filed May 25, 1912. Serial No. 699,637.

*To all whom it may concern:*

Be it known that I, JAMES E. GOODHUE, a citizen of the United States, residing at St. Charles, in the county of Kane and State of Illinois, have invented a new and useful Improvement in Corn-Husking Machines, of which the following is a specification.

My invention relates more particularly to husking machines of the general type disclosed in United States Letters Patent No. 739,540, granted to me on September 22, 1903, and involving, generally stated, means for breaking the ears of corn from the stalks, rollers for removing the husks from the ears, cutting or shredding means into engagement with which the stalks are carried, means for carrying the husks and cut or shredded stalks away from the machine, preferably to a blower for this purpose, and in said conveying movement causing the husks and cut or shredded stalks to pass over the screened top of a chute whereby any loose kernels of corn commingled with the pieces of stalks or husks, together with fine particles of the latter, pass through the screen into the chute wherein they are subjected to an air-blast which blows the fine particles out through the chute and permits the kernels to descend into a receptacle. In the machines of the type disclosed in said patent as hitherto constructed, the means for conveying the husks and cut or shredded stalks, through the machine, were in the form of an endless carrier which served not only to advance the husks and the cut or shredded stalks, but also to mix them together and pass the mixture over the screen. The arrangement of the conveyer was such, however, that its lowermost portion extended entirely below the cleaner-fan and thus the conveyer at its lower end extended close to the ground, which was objectionable because of the danger of clogging thereof by reason of the fact that when machines of this type are in operation, there are usually comparatively great quantities of litter around them, and furthermore, because there was a possibility, under some conditions, of the conveyer becoming disarranged.
My object is to provide a machine wherein all the advantages of machines as hitherto constructed shall be obtained, and the objections, as hereinabove pointed out, overcome.

Referring to the accompanying drawings, Figure 1 is a view in side elevation of a machine constructed in accordance with my invention. Fig. 2 is a view in longitudinal sectional elevation taken through the center of the machine and showing the middle portion thereof. Fig. 3 is a sectional view taken at the line 3 on Fig. 4 and viewed in the direction of the arrow, showing the mechanism for vibrating the separator-screen. Fig. 4 is a section taken at the line 4 on Fig. 3 and viewed in the direction of the arrow; and Fig. 5, an enlarged broken section taken at the line 5 on Fig. 3 and viewed in the direction of the arrow.

6 is the frame of the machine, upon which coöperating snapping-rollers 7 of any desirable construction and driven in any suitable manner, as is common practice, are journaled; and 8, a stalk cutter or shredder driven, as hereinafter described, and operating to cut into suitable lengths, or shred, the stalks which are delivered thereto by the snapping-rolls, as is general practice in connection with machines of this type and fully disclosed in said Letters Patent. The ears of corn broken off from the stalks by the rolls 7 drop upon husking rolls 9, which may be of any well known construction, and are journaled in boxes 10 on the machine to extend lengthwise thereof and incline upwardly toward the rear end of the machine. The husks removed from the ears by the rolls 9 fall onto a table 11 along which they are carried up and across a screen 12 forming the top of a chute 13 open at its opposite ends and supported and operated as hereinafter described, the shredded or cut stalks being discharged upon the screen-top 12 and commingling with the husks. The conveying means referred to operate to advance the commingled husks and stalks to a blower, represented at 14, and having a dischargepipe 15. In the movement of the husks and stalks along the screen 12, the relatively fine particles of husks and stalks and any loose kernels of corn separated from the ears thereof in the hereinbefore described operations, pass through the screen into the inclined chute 13, wherein they are subjected to an air-blast, as from a fan 16, journaled in a housing 17 on the machine and opening through a conduit 18 into the lower expanded end of the chute 13, the air-blast serving to blow the fine particles of stalks and husks out through the upper end of the chute into the blower 14, for discharge through the conduit 15, whereas the kernels of corn, by reason of their greater weight, drop into an inclined chute 20 located below the lower end of the chute 13 and adapted to discharge the kernels into a receptacle (not shown).

The conveyer for moving the husks along the table 11 and the husks and stalks along the screen 12, as hereinbefore stated, is represented at 21 and is of a well known construction involving a pair of endless chains 22, spaced apart, and an endless series of transversely-extending slats 23, spaced apart and connected therewith, the conveyer 21 in practice bearing at its slats 23 upon the upper surfaces of the table 11 and the screen 12. The conveyer 21 is supported by its chains 22 on sprockets 24 on a shaft 25 and sprockets (not shown), on a shaft 26 located at opposite ends of the machine and below the table 11 and screen 12, and intermediate the sprockets on the shafts 25 and 26, the conveyer engages rollers 27 and 28 on shafts 29 and 30 journaled on the machine, and so arranged, as illustrated, as to cause the conveyer 21 to extend transversely of the conduit 18 and into the path of the air-blast produced therethrough by the fan 16, the roller 29 being arranged above the lower stretch of the conveyer and the roller 30 being located below the lower stretch thereof, as illustrated.

To the end of permitting the conveyer 21 to travel transversely through the conduit 18, I provide openings 31 and 32 in the upper and lower walls thereof; and to provide for the effective guidance of the conveyer 21 therethrough, I equip the conduit 18 at its opposite sides, on its inner surfaces, with upper and lower cleats 33 and 33ª between the pairs of which the chains 22 travel, the pairs of cleats 33 and 33ª, at opposite sides of the conduit 18, being spaced apart sufficiently to permit the slats 23 to pass freely between the same.

It will be understood from the foregoing that the air-blasts through the conduit 18 produced by the rotation of the fan 16 in the direction of the arrow (Fig. 2), will thus be directed through the conveyer 21 and thence into the chute 13 where it performs the separating function hereinbefore referred to, the skeleton formation of conveyer employed not materially affecting the air-blast through the conduit 18.

To avoid escape of air through the openings 31 and 32, I prefer to upwardly and downwardly deflect the top and bottom walls, respectively, of the conduit 18 beyond the openings 31 and 32, relative to the corresponding walls below said openings, thereby causing the portion of the conduit 18 beyond the conveyer to be of flaring form and effectually prevent loss of air pressure from the conduit 18.

The driving connections for the various parts of the machine are as follows: The main drive-shaft is represented at 34 and is adapted to be driven in any suitable manner, this shaft carrying the cutting or shredding members 8. The drive-shaft 34 is connected, by means of a belt 35 with a pulley 36 on a shaft 37 and with a pulley 38 on a shaft 38ª to which the rotary member of the fan 16 is connected, the belt 35 passing over the idle pulley 39 of a belt-tightener device 40. The rolls 7 are driven from the shaft 34, as through the medium of gears, diagrammatically represented at 41 and 42, rigid with the shaft 34 and with one of the rolls 7, respectively, said rolls, in practice, being operatively connected together to rotate in opposite directions, in a manner well known in the art. The shaft 37 is equipped with a pair of beveled pinions 43 meshing with similar pinions 44 (one only of which is shown), on each pair of coöperating husking rolls 9, in the machine illustrated provision being made for employing two pairs of these rolls, the members of each pair of which, in practice, would be geared together through the medium of gears 45 (one only of which is shown), as illustrated in said Letters Patent.

The conveyer 21 is actuated from the shaft 37, through the medium of a cross-belt 46 passing around a pulley 47 on the shaft 37 and a pulley 48 on the shaft 26.

In the construction illustrated, it is understood that both chutes 13 and 20 are reciprocated, the chute 13, which is overlapped at its lower screened end by a plate-extension 49 on the table 11, being provided with laterally-extending flanges 50 at which the chute rests on angle-irons 51 secured to the inner surfaces of the side boards 52 of the machine, which extend preferably below the greater portion of the conveyer 21 between the shafts 26 and 27, the chute, toward its upper end, being provided with studs 53 which extend through slots 54 in the side boards 52 and at which studs the chute is supported at its upper end. The studs 53 are pivotally connected with heads 55 provided on links 56 arranged at opposite sides of the machine and connected with the straps 57 of eccentrics 58 fixed on the shaft 37, whereby, when the shaft 37 is actuated, the chute 13, and of which the screen 12 is a rigid part, is caused to be reciprocated and thus effectually screen the kernels of corn and the fine particles of the husks and stalks from the material traversing the screen 12, as hereinbefore described. The chute 20 is pivotally connected, as indicated at 59 and 60, with the lower ends of a link 61 and a bell-crank lever 62, respectively, pivoted on the frame of the machine, as indicated at 63 and 64 respectively, the outer end of the bell-crank 62 being pivotally connected, as indicated at 65, with the lower end of a rod 66 secured to one of the straps 57, whereby when the shaft 37 is rotated, the chute 20 will be reciprocated back and forth transversely of the machine and thus eject from its lower discharge end, into a receptacle (not shown), the kernels of corn separated from the husks and stalks in the chute 13, as hereinbefore described.

It will be manifest that by so arranging the conveyer 21 as to cause it to travel through the air-blast conduit, the conveyer may be caused to extend at such a distance above the ground that there is no danger of the litter, which surrounds the machine when in operation, becoming entangled in the conveyer and thus impairing its operation. Furthermore, the action of the air-blast against the slats 23 serves to clean them of any shreds of husks or stalks which in the conveying operation may become lodged thereon and which, if not removed, might impair the proper operation of the conveyer. Another advantage due to the arrangement of the conveyer mechanism as described, is that of maintaining the chains 22 in taut condition for preventing disengagement thereof from their coöperating sprockets. In fact, the arrangement of the rollers 27 and 28, by reason of their engagement with the chains 22 above and below the latter, as illustrated, serves, so far as the feature of rendering the chains taut is concerned, as effectually as is the case where the conveying mechanism is formed of a plurality of endless conveyers.

What I claim as new and desire to secure by Letters Patent is—

1. In a machine of the character set forth, the combination of a perforated support for the material from which the loose kernels of corn are to be separated, a chute below said support, air-blast-producing means for blowing air into said chute, and an endless conveyer for moving said material along said support, supported to extend intermediate said blast-producing means and said chute and traverse the path of said air-blast.

2. In a machine of the character set forth, the combination of a support for receiving the husks, a perforated support beyond said first-named support for receiving the pieces of stalks, a chute below said perforated support, air-blast-producing means for blowing air into said chute, and an endless conveyer supported to extend intermediate said blast-producing means and said chute and traverse the path of said air-blast, for conveying the husks along said first-named support to said perforated support and moving the husks and pieces of stalks with loose kernels of corn mixed therein, over said perforated support.

3. In a machine of the character set forth, the combination of a support for receiving the husks, a perforated support beyond said first-named support for receiving the pieces of stalks, a chute below said perforated support, air-blast-producing means for blowing air into said chute, an endless conveyer for feeding the husks along said first-named support to said perforated support and moving the husks and pieces of stalks, with loose kernels of corn mixed therein, over said perforated support, and means engaging with said conveyer against the under and upper sides thereof above and below said chute, respectively, for deflecting said conveyer transversely through said air-blast, for the purpose set forth.

4. In a machine of the character set forth, the combination of a support for receiving the husks, a perforated support beyond said first-named support for receiving the pieces of stalks, a chute below said perforated support, air-blast-producing means, a conduit communicating with said air-blast-producing means and arranged to discharge an air-blast into said chute, and an endless conveyer supported to extend intermediate said blast-producing means and said chute and traverse the path of said air-blast, for conveying the husks along said first-named support to said perforated support and moving the husks and pieces of stalks with loose kernels of corn mixed therein, over said perforated support.

5. In a machine of the character set forth, the combination of a support for receiving the husks, a perforated support beyond said first-named support for receiving the pieces of stalks, a chute below said perforated support, air-blast-producing means, a conduit communicating with said air-blast-producing means and arranged to discharge an air-blast into said chute, and an endless conveyer supported to extend through said conduit and traverse the path of said air-blast, for conveying the husks along said first-named support to said perforated support and moving the husks and pieces of stalks with loose kernels of corn mixed therein, over said perforated support, the cross-sectional area of said conduit at the opening through which said conveyer extends and beyond said conveyer being greater than the cross-sectional area of the conduit at the opposite side of said opening.

6. In a machine of the character set forth, the combination of a support for receiving the husks, a perforated support beyond said first-named support for receiving the pieces of stalks, a chute below said perforated support, air-blast-producing means, a conduit communicating with said air-blast-producing means and arranged to discharge an air-blast into said chute, the opposed walls of said conduit containing openings, upper and lower spaced guide-cleats arranged at opposite sides of the conduit and at the ends of said openings, and an endless conveyer formed of endless chains spaced apart and an endless series of slats extending transversely of and connected with said chains, said conveyer being supported to extend through said openings in said conduit and into engagement at its chains with said guide-cleats, for the purpose set forth.

JAMES E. GOODHUE.

In presence of—
 RALPH A. SCHAEFER,
 JOHN WILSON.

Copies of this patent may be obtained for five cents each, by addressing the "Commissioner of Patents, Washington, D. C."